(12) United States Patent
Kazaryan et al.

(10) Patent No.: US 7,312,976 B2
(45) Date of Patent: Dec. 25, 2007

(54) HETEROGENEOUS ELECTROCHEMICAL SUPERCAPACITOR AND METHOD OF MANUFACTURE

(75) Inventors: Samvel Avakovich Kazaryan, Troitsk (RU); Gamir Galievich Kharisov, Troitsk (RU); Vladimir Alexandrovich Kazarov, Troitsk (RU); Sergey Vitalievich Litvinenko, Zelenograd (RU); Sergey Nikolaevich Razumov, Moscow (RU)

(73) Assignee: Universal Supercapacitors LLC, Columbus, OH (US)

( * ) Notice: Subject to any disclaimer, the term of this patent is extended or adjusted under 35 U.S.C. 154(b) by 128 days.

(21) Appl. No.: 11/359,097

(22) Filed: Feb. 22, 2006

(65) Prior Publication Data

US 2006/0291140 A1    Dec. 28, 2006

(51) Int. Cl.
*H01G 9/00* (2006.01)
(52) U.S. Cl. ............... 361/502; 361/503; 361/504; 361/508; 361/511; 361/512
(58) Field of Classification Search ............... 361/502, 361/503, 504, 508–512, 516–519, 302–305, 361/523–534
See application file for complete search history.

(56) References Cited

U.S. PATENT DOCUMENTS

| | | | |
|---|---|---|---|
| 3,601,665 A | 8/1971 | O'Nan et al. |
| 4,438,481 A | 3/1984 | Phillips et al. |
| 4,562,511 A | 12/1985 | Nishino et al. |
| 4,697,224 A | 9/1987 | Watanabe |
| 5,045,170 A | 9/1991 | Bullock et al. |
| 5,065,286 A | 11/1991 | Kurabayashi et al. |
| 5,072,335 A | 12/1991 | Kurabayashi et al. |
| 5,072,336 A | 12/1991 | Kurabayashi et al. |
| 5,072,337 A | 12/1991 | Kurabayashi et al. |
| 5,080,963 A | 1/1992 | Tatarchuk et al. |

(Continued)

FOREIGN PATENT DOCUMENTS

CA    2137323    6/1995

(Continued)

OTHER PUBLICATIONS

Evans, David A. & Miller, John R., Hybrid Electrolytic/Electrochemical Capacitor for Electric Vehicles, Proccedings—Electrochemical Society, 1997, pp. 253-257, vol. 96-25.

(Continued)

*Primary Examiner*—Nguyen T. Ha
(74) *Attorney, Agent, or Firm*—Standley Law Group LLP

(57) ABSTRACT

The present invention relates to a double electric layer heterogeneous electrochemical supercapacitor (HES) and a method of manufacture. Single-cell or multi-cell versions of the HES can be produced. Output characteristics of the HES are optimized by carefully controlling particular parameters of the HES' design and construction. For example, the ratio between the charging capacities of the positive electrode and negative electrode of the HES is carefully selected and controlled, an active material of higher efficiency than the active material used by typical electrochemical capacitors is preferably utilized in the construction of both the positive and negative electrodes, a separator with improved operating parameters is used, and the negative electrode current collector is preferably manufactured from a material having a matching layer—which ensures high conductivity, high hydrogen gassing overpotential, and high stability within a range of negative electrode operating potentials within the electrolyte environment of the HES.

40 Claims, 6 Drawing Sheets

U.S. PATENT DOCUMENTS

| | | | |
|---|---|---|---|
| 5,099,398 A | 3/1992 | Kurabayashi et al. | |
| 5,102,745 A | 4/1992 | Tatarchuk et al. | |
| 5,121,301 A | 6/1992 | Kurabayashi et al. | |
| 5,142,451 A | 8/1992 | Kurabayashi et al. | |
| 5,187,033 A | 2/1993 | Koshiba | |
| 5,262,254 A | 11/1993 | Koksbang et al. | |
| 5,304,330 A | 4/1994 | Tatarchuk et al. | |
| 5,369,547 A | 11/1994 | Evans | |
| 5,392,191 A | 2/1995 | Thomas et al. | |
| 5,429,893 A | 7/1995 | Thomas | |
| 5,441,830 A | 8/1995 | Moulton et al. | |
| 5,464,453 A | 11/1995 | Tong et al. | |
| 5,464,706 A | 11/1995 | Dasgupta et al. | |
| 5,464,707 A | 11/1995 | Moulton et al. | |
| 5,478,676 A | 12/1995 | Turi et al. | |
| 5,518,839 A | 5/1996 | Olsen | |
| 5,527,640 A | 6/1996 | Rudge et al. | |
| 5,547,782 A | 8/1996 | Dasgupta et al. | |
| 5,568,353 A | 10/1996 | Bai et al. | |
| 5,578,396 A | 11/1996 | Fauteux et al. | |
| 5,578,399 A | 11/1996 | Olsen | |
| 5,580,686 A | 12/1996 | Shi et al. | |
| 5,600,535 A | 2/1997 | Jow et al. | |
| 5,604,660 A | 2/1997 | Bai et al. | |
| 5,621,607 A | 4/1997 | Farahmandi et al. | |
| 5,714,053 A | 2/1998 | Howard | |
| 5,729,427 A | 3/1998 | Li et al. | |
| 5,777,428 A | 7/1998 | Farahmandi et al. | |
| 5,824,436 A | 10/1998 | Lian et al. | |
| 5,955,215 A | 9/1999 | Kurzweil et al. | |
| 5,986,876 A | 11/1999 | Stepanov et al. | |
| 6,031,711 A | 2/2000 | Tennent et al. | |
| 6,031,712 A | 2/2000 | Kurihara et al. | |
| 6,059,847 A | 5/2000 | Farahmandi et al. | |
| 6,063,143 A | 5/2000 | Stepanov et al. | |
| 6,064,561 A | 5/2000 | Harada et al. | |
| 6,088,217 A | 7/2000 | Patel et al. | |
| 6,094,338 A * | 7/2000 | Hirahara et al. | 361/502 |
| 6,115,235 A * | 9/2000 | Naito | 361/303 |
| 6,181,545 B1 | 1/2001 | Amatucci et al. | |
| 6,181,546 B1 | 1/2001 | Stepanov et al. | |
| 6,187,061 B1 | 2/2001 | Amatucci et al. | |
| 6,195,252 B1 * | 2/2001 | Belyakov et al. | 361/502 |
| 6,201,685 B1 | 3/2001 | Jerabek et al. | |
| 6,205,016 B1 | 3/2001 | Niu | |
| 6,222,723 B1 | 4/2001 | Razoumov et al. | |
| 6,335,857 B1 | 1/2002 | Takimoto et al. | |
| 6,335,858 B1 | 1/2002 | Vasechkin et al. | |
| 6,339,529 B1 | 1/2002 | Kasahara et al. | |
| 6,341,057 B1 | 1/2002 | Nissen et al. | |
| 6,343,003 B1 | 1/2002 | Sakata et al. | |
| 6,349,027 B1 | 2/2002 | Suhara et al. | |
| 6,350,520 B1 | 2/2002 | Nesbitt et al. | |
| 6,353,528 B1 | 3/2002 | Hori et al. | |
| 6,356,432 B1 | 3/2002 | Danel et al. | |
| 6,356,433 B1 | 3/2002 | Shi et al. | |
| 6,379,402 B1 | 4/2002 | Suhara et al. | |
| 6,383,427 B2 | 5/2002 | Ishikawa et al. | |
| 6,383,640 B1 | 5/2002 | Shi et al. | |
| 6,402,792 B1 | 6/2002 | Hiratsuka et al. | |
| 6,414,836 B1 | 7/2002 | Tennent et al. | |
| 6,426,862 B1 | 7/2002 | Vasechkin et al. | |
| 6,430,031 B1 | 8/2002 | Dispennette et al. | |
| 6,449,139 B1 | 9/2002 | Farahmandi et al. | |
| 6,454,815 B1 | 9/2002 | Finello et al. | |
| 6,466,429 B1 | 10/2002 | Volfkovich et al. | |
| 6,491,789 B2 | 12/2002 | Niu | |
| 6,493,210 B2 | 12/2002 | Nonaka et al. | |
| 6,503,432 B1 | 1/2003 | Barton et al. | |
| 6,510,043 B1 | 1/2003 | Shiue et al. | |
| 6,512,667 B2 | 1/2003 | Shiue et al. | |
| 6,515,845 B1 | 2/2003 | Oh et al. | |
| 6,522,522 B2 | 2/2003 | Yu et al. | |
| 6,563,694 B2 | 5/2003 | Kim et al. | |
| 6,574,092 B2 | 6/2003 | Sato et al. | |
| 6,576,365 B1 | 6/2003 | Meitav et al. | |
| 6,602,742 B2 | 8/2003 | Maletin et al. | |
| 6,614,646 B2 | 9/2003 | Bogaki et al. | |
| 6,628,504 B2 * | 9/2003 | Volfkovich et al. | 361/502 |
| 6,631,074 B2 | 10/2003 | Bendale et al. | |
| 6,702,963 B2 | 3/2004 | Kibi et al. | |
| 6,706,079 B1 | 3/2004 | Shmatko et al. | |
| 6,762,926 B1 | 7/2004 | Shiue et al. | |
| 6,773,468 B2 | 8/2004 | Lang | |
| 6,830,595 B2 | 12/2004 | Reynolds | |
| 6,855,273 B2 | 2/2005 | Ravet et al. | |
| 6,876,539 B2 | 4/2005 | Michel et al. | |
| 6,924,063 B2 | 8/2005 | Che et al. | |
| 6,937,460 B2 | 8/2005 | Lang | |
| 6,940,706 B2 | 9/2005 | Sakata et al. | |
| 6,962,666 B2 | 11/2005 | Ravet et al. | |
| 6,967,183 B2 | 11/2005 | Hampden-Smith et al. | |
| 7,006,346 B2 | 2/2006 | Volkovich et al. | |
| 2002/0048144 A1 | 4/2002 | Sugo et al. | |
| 2002/0114126 A1 | 8/2002 | Hirahara et al. | |
| 2002/0122980 A1 | 9/2002 | Fleischer et al. | |
| 2002/0122985 A1 | 9/2002 | Sato et al. | |
| 2002/0136946 A1 | 9/2002 | Amatucci et al. | |
| 2003/0031926 A1 | 2/2003 | Farmer et al. | |
| 2003/0036001 A1 | 2/2003 | James et al. | |
| 2003/0070916 A1 | 4/2003 | Nanno et al. | |
| 2003/0118884 A1 | 6/2003 | Hampden-Smith et al. | |
| 2004/0120100 A1 | 6/2004 | Reynolds | |
| 2004/0131944 A1 | 7/2004 | Visco et al. | |
| 2004/0140458 A1 | 7/2004 | Ravet et al. | |
| 2004/0141282 A1 | 7/2004 | Hudis | |
| 2004/0191617 A1 | 9/2004 | Visco et al. | |
| 2004/0197641 A1 | 10/2004 | Visco et al. | |
| 2004/0199015 A1 | 10/2004 | Yuyama et al. | |
| 2005/0007727 A1 | 1/2005 | Lang | |
| 2005/0019656 A1 | 1/2005 | Yoon et al. | |
| 2005/0089754 A1 | 4/2005 | Lang | |
| 2005/0141170 A1 | 6/2005 | Honda et al. | |
| 2005/0271798 A1 | 12/2005 | Zhong et al. | |

FOREIGN PATENT DOCUMENTS

| | | |
|---|---|---|
| EP | 0680061 | 11/1995 |
| EP | 0763836 | 3/1997 |
| EP | 1043744 | 10/2000 |
| EP | 1156500 | 11/2001 |
| EP | 1013506 | 6/2002 |
| WO | 96/12313 | 4/1996 |
| WO | 9924996 | 5/1999 |
| WO | 0033336 | 6/2000 |
| WO | 0219357 | 3/2002 |
| WO | 03/098648 | 11/2003 |

OTHER PUBLICATIONS

Varakin, I.N., Klementov, A.D., Litvinenko, S.V., Starodubtsev, N.F., & Stepanov, A.B., Electrochemical Ultracapacitors and Modules of "ESMA" Company, Official Proceedings 11th Int. Power Quality, Nov. 1998, pp. 90-98.

* cited by examiner

| HES # | + ELECTRODE CONSTRUCTION | - ELECTRODE CONSTRUCTION | PLATE COUNT | DISCHARGE CAPACITANCE (10 hr. discharge) | CAPACITANCE | SPECIFIC ENERGY | VOLTAGE (rated/min.) | INTERNAL RESISTANCE | WEIGHT | SIZE (mm) |
|---|---|---|---|---|---|---|---|---|---|---|
| 1 | $Pb/Pb_3O_4/PbO$ in grid of Pb and Sb (5%) | Active mass of activated carbon on lead and tin (3%) current collector | 7+/8- | 52.5 Ah | 73.0 kF | 25.8 Wh/kg | 2.04/0.8 V | $1.95 \times 10^{-3}$ Ω | 1.38 kg | 190x83x 33 |
| 2 | $Pb/Pb_3O_4/PbO$ doped with $Ti_2O_{13}$ and $Ti_6O_{16}$ in grid of Pb and Sb (5%) | Active mass of activated carbon on lead and tin (3%) current collector | 7+/8- | 57.0 Ah | 75.0 kF | 26.5 Wh/kg | 2.08/0.8 V | $1.02 \times 10^{-3}$ Ω | 1.31 kg | 190x83x 33 |
| 3 | $Pb/Pb_3O_4/PbO$ doped with $(Bi_2O_3)$ or $(Bi(NO_3)^3 \cdot 5H_2O)$ in grid of Pb and Sb (5%) | Active mass of activated carbon on lead and tin (3%) current collector | 7+/8- | 54.5 Ah | 73.0 kF | 24.6 Wh/kg | 2.04/0.8 V | $1.65 \times 10^{-3}$ Ω | 1.38 kg | 190x83x 33 |
| 4 | $Pb/Pb_3O_4/PbO$ in grid of Pb and Sb (5%) | Active mass of activated carbon on lead and tin (3%) current collector | 7+/8- | 52.5 Ah | 73.0 kF | 25.8 Wh/kg | 2.12/0.8 V | $1.43 \times 10^{-3}$ Ω | 1.32 kg | 190x83x 33 |
| 5 | $Pb/Pb_3O_4/PbO$ doped with $Ti_2O_{13}$ and $Ti_6O_{16}$ in grid of Pb and Sb (5%) | Active mass of activated carbon on lead and tin (3%) current collector having matching layer of remchlorine and $Ti_3O_{15}$ | 7+/8- | 52.5 Ah | 73.0 kF | 30.0 Wh/kg | 2.12/0.7 V | $0.98 \times 10^{-3}$ Ω | 1.32 kg | 190x83x 33 |
| 6 | $Pb/Pb_3O_4/PbO$ doped with $Ti_2O_{13}$ and $Ti_6O_{16}$ in grid of Pb and Sb (5%) | Active mass of activated carbon on lead and tin (3%) current collector having matching layer of remchlorine and $Ti_3O_{15}$ | 5+/6- | 42 Ah | 98.4 kF | 46 Wh/kg | 2.10/0.8 V | $2.75 \times 10^{-3}$ Ω | 1.15 kg | 190x83x 33 |
| 7 | $Pb/Pb_3O_4/PbO$ in grid of Pb and Sb (5%) | Active mass of activated black carbon on lead and tin (3%) current collector having matching layer of TIKOLAK and URETHANE-CLEAR | 5+/6- | 37.7 Ah | 58 kF | 25.8 Wh/kg | 2.17/0.8 V | $2.4 \times 10^{-3}$ Ω | 1.05 kg | 190x83x 33 |

*FIG. 6*

HETEROGENEOUS ELECTROCHEMICAL SUPERCAPACITOR AND METHOD OF MANUFACTURE

This application claims the benefit of PCT Application Ser. No. PCT/RU2005/000344, filed on Jun. 24, 2005.

BACKGROUND OF THE INVENTION

The present invention relates to a heterogeneous electrochemical supercapacitor (HES), and to a method for manufacturing such a capacitor. More particularly, the present invention is directed to an improved HES. A HES of the present invention exhibits superior operating parameters in comparison to other electrochemical capacitors of known design.

There is an increasing focus on the use of double electric layer (DEL) electrochemical capacitors as a means for storing electrical energy. Among known electrochemical capacitors the HES typically exhibits the highest specific energy while simultaneously providing for electrical energy storage at the lowest cost. In the electrodes of conventional electrochemical capacitors, electric charge exists in a free state and the energy of both electrodes is potential energy. Unlike conventional capacitors, charge carriers appear in the non-polarizable electrode of a HES due to phase transition of the second kind, and exist in the polarizable electrode in a free or loosely coupled state. Since the energy associated with the polarizable electrode is potential energy and energy of the non-polarizable electrode is chemical energy, the nature of origin of electric charge and energy with respect to the electrodes differs and, hence, the proposed supercapacitor is considered to be heterogeneous. Such supercapacitors can efficiently store and redistribute a large amount of electrical energy. For purposes of illustration, and not limitation, such capacitors may be used: as a main power supply; as a back-up power supply; for power quality assurance (i.e., to compensate for short-term power "surges", "spikes", and "skips" common to a utility-supplied source of electrical power); to provide load-leveling by storing an amount of electrical energy provided during off-peak hours and re-distributing said electrical energy during periods of peak demand; and as a primary or secondary power source for a variety of vehicles.

A HES typically uses only lead and activated carbon as the primary components for manufacturing its electrodes. A HES is typically of double electric layer (DEL) design. A DEL capacitor typically employs a pair of electrodes that are arranged in a spaced apart relationship, and between which resides an electrolyte. The electrolyte is generally aqueous in nature. A separator typically also resides in the space between the electrodes. One or both of the electrodes may store electrical energy through a double layer electrochemical mechanism. In a double electric layer storage process, a layer of electrons forms at the electrode side of the electrode/electrolyte interface. A layer of positive ions also forms on the electrolyte side of the electrode/electrolyte interface. The voltage across the interface between the electrode and electrolyte increases with charge accumulation, and is eventually released during discharge of the capacitor.

One or both of the electrodes of a DEL capacitor may generally be polarizable electrodes. A polarizable electrode may comprise, for example, an active material and a current collector to which the active material is affixed. The most commonly employed active material is likely one of a plurality of activated carbon materials. Activated carbon materials are inexpensive and have a high specific surface are per unit mass. Negative electrodes are typically formed from activated carbon materials in the form of an activated carbon powder and binder, or from woven or non-woven activated carbon fiber materials. However, preparation of DEL electrodes from an activated carbon powder is often preferable due to its lower cost. Positive electrodes may be formed from various conductive materials, particularly metals.

As stated above, in a typical DEL capacitor, one or both of the electrodes may be polarizable. However, constructing a DEL capacitor with one polarizable electrode and one non-polarizable electrode has been shown to provide the DEL capacitor with a specific energy capacity that is greater than that of a capacitor with two polarizable electrodes. In such a DEL capacitor, charge storage at the non-polarizable electrode occurs as a result of oxidation and reduction reactions at the interface of the non-polarizable electrode and the electrolyte. Such an electrode is commonly said to exhibit Faradic pseudocapacitive behavior. In a HES of DEL design, the nonpolarizable electrode is typically comprised substantially of lead.

At least the negative electrode of such a DEL capacitor is typically affixed by some means to a current collector. Current collectors are commonly constructed of a material that exhibits electrical conductivity—typically a metal. As at least a portion of the current collector, along with the electrode material, must reside in the electrolyte, it is preferable that the collector material will not react adversely thereto. For example, the electrolyte of a DEL capacitor may consist of an aqueous sulfuric acid. In such a case, certain precautions such as, for example, coating or otherwise protecting the portion of the current collector exposed to the electrolyte may need to be undertaken, as the sulfuric acid electrolyte may erode, or otherwise degrade the current collector material.

Various embodiments of electrochemical capacitors are currently known. However, there are disadvantages to many of these known electrochemical capacitor designs. For example, one concern with the use of electrochemical capacitors is cost—both the cost to manufacture the capacitors, and the cost of storing energy therewith. With the exception of a HES, known electrochemical capacitors generally employ materials such as aluminum, nickel, niobium, ruthenium, tantalum, titanium, and tungsten in their construction. These materials are considerably more expensive than the lead material typically used in a HES. Consequently, both the cost to manufacture and the cost to store energy using electrochemical capacitors of typical design can often be prohibitive.

SUMMARY OF THE INVENTION

The HES of the present invention offers advantages over known electrochemical capacitor designs, including that of other HES'. For example, the design and manufacture of a HES according to the present invention provides for an electrochemical capacitor of high discharge power. A HES of the present invention also exhibits high specific power characteristics, whether measured by weight or by volume. In addition, the method of manufacturing the HES allows for lower production costs and reduced assembly time. A HES of the present invention also has high cycling capacity (a long life cycle).

The aforesaid advantages afforded by a HES of the present invention are the result of at least several factors. First, the ratio between the charging capacities of the positive electrode and negative electrode of the HES is carefully selected and controlled. An active material of higher efficiency than the active material used by typical electrochemical capacitors is also utilized in the construction of both the positive and negative electrodes of the HES of the present invention. A HES of the present invention further employs a separator with improved operating parameters. Additionally, the negative electrode current collector is preferably manufactured from a material having a matching layer, which ensures high conductivity, high hydrogen gassing overpotential and high stability within a range of negative electrode operating voltages within the electrolyte environment of the HES.

A HES of the present invention can have a higher discharge power and higher specific capacitance than typical electrochemical capacitors. Thus, a HES of the present invention can be effectively used as a means of significant electrical energy storage and power output. A HES of the present invention relies primarily on lead and activated carbon to form its electrodes. Consequently, a HES of the present invention is also a cost effective means of electrical energy storage. Other advantages of a HES of the present invention can be understood from a reading of the following detailed description thereof.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 6 is a table detailing various output parameters of several exemplary HES designs according to the present invention.

DETAILED DESCRIPTION OF THE EXEMPLARY EMBODIMENT(S)

Figure 1:
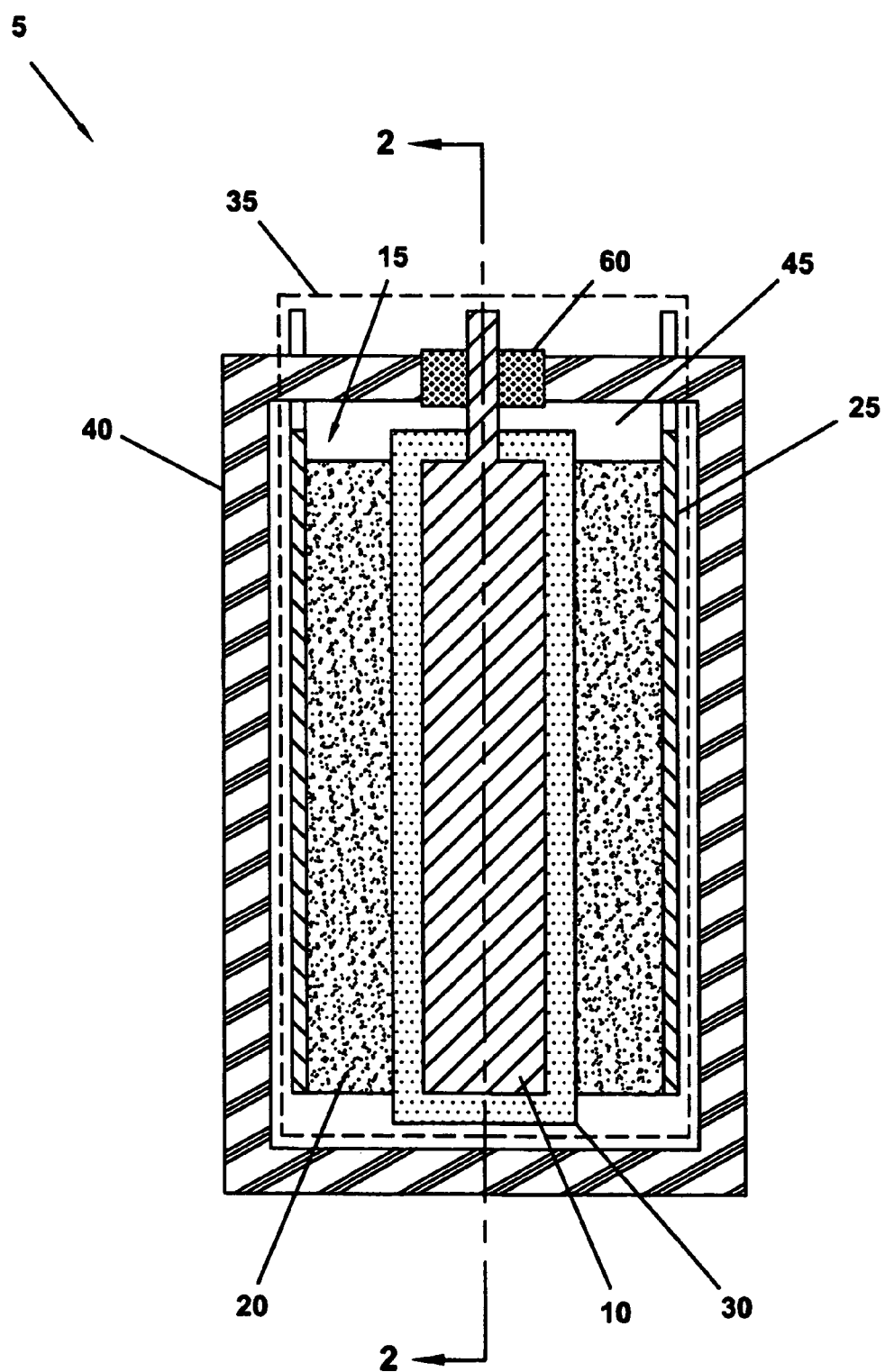
FIG. 1 illustrates a side view, in cross-section, of one embodiment of a single-cell HES of the present invention.
Figure 2:
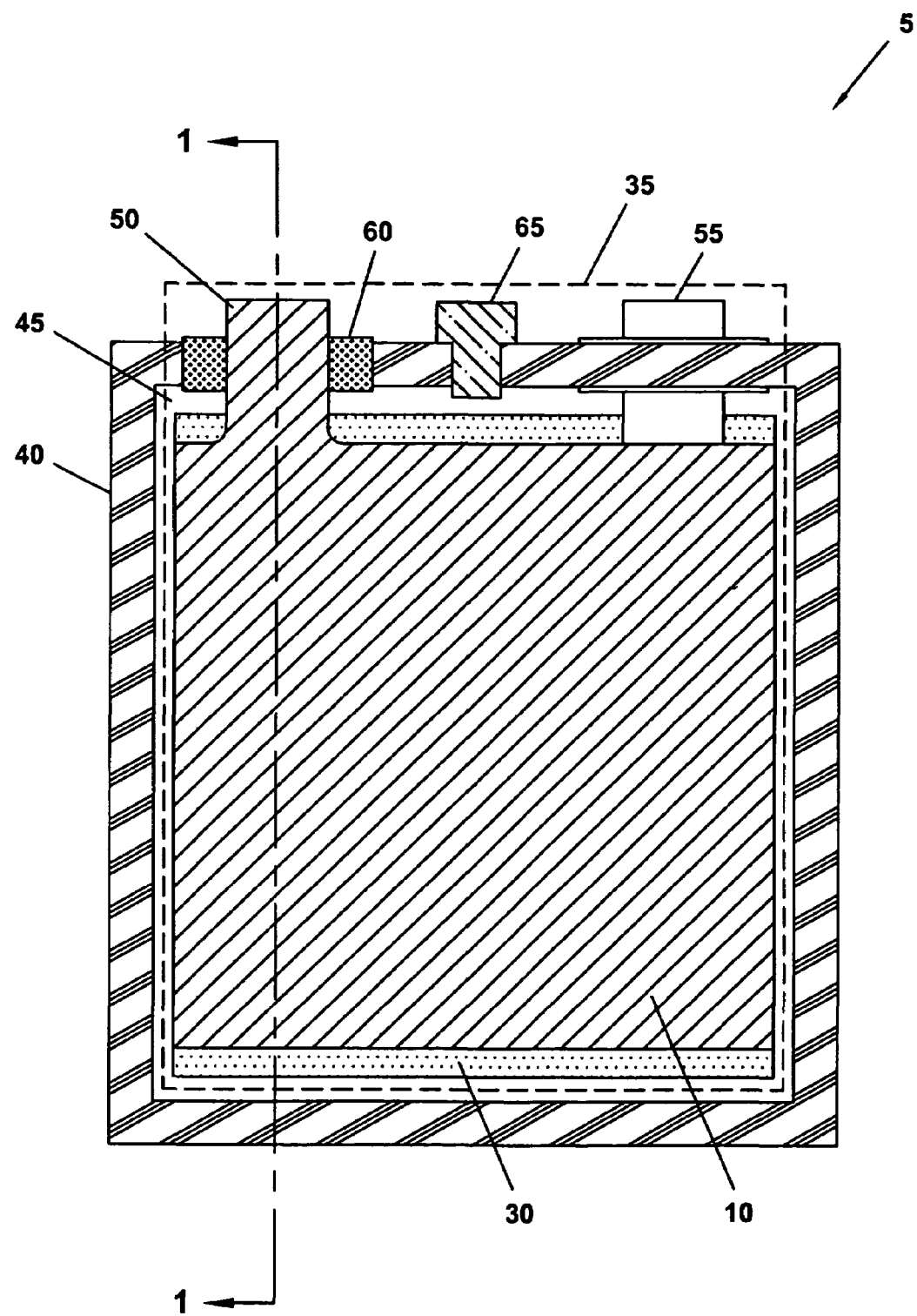
FIG. 2 is a front view of the HES of FIG. 1.

An exemplary embodiment of a single-cell HES of the present invention can be seen by reference to FIGS. 1-2. As can be observed, in this particular embodiment, the HES 5 has a positive electrode 10 that resides between two negative electrodes 15. Each negative electrode 15 comprises an active mass 20 having a current collector 25 affixed thereto. The positive electrode 10 is separated from the negative electrodes 15 by a separator 30. The assembly 35 of the positive electrode 10, negative electrodes 15, and separator 30 is contained within a sealed case 40. An electrolyte 45 is present within the case, and substantially surrounds the assembly 35. In this embodiment of the HES 5, a portion of each of the positive electrode 10 and the negative electrode current collector 25 are allowed to protrude through the case to form a positive terminal 50 and negative terminal 55, respectively. Preferably, a seal 60 is provided around each of the terminals 50, 55 to prevent leakage of the electrolyte 45 from the case 40. The case 40 may also be provided with a relief valve 65, in order to vent the case 40 should the pressure therein exceed a predetermined level.

A HES of the present invention offers advantages over typical electrochemical capacitors. These advantages are obtained by carefully controlling particular characteristics of the above-referenced components of the HES 5. For example, in one exemplary embodiment, wherein the HES has a positive electrode having an active mass of lead dioxide and an aqueous sulfuric acid electrolyte, it has been found that doping can increase the performance of the positive electrode. More particularly, it has been found that doping of the positive electrode can significantly increase its factor of active material use and its discharge power, and can reduce its electrical resistance. Several design factors must be taken into consideration when producing such an electrode, however. First, high potential values of lead dioxide and overpotential of oxygen gassing serve to initially limit the range of materials that can be acceptably employed as dopants. Further, within this narrow range of materials, a dopant is preferably selected that: (1) does not decrease the overpotential of oxygen gassing; (2) does not decrease the specific capacitance and power of charge and discharge; and (3) does not degrade the initial properties and parameters of the separator, the electrolyte, or the negative electrode. It has been found that admixtures of titanium or titanium oxides $[Ti_nO_{2n-1}]$ function especially well as dopants for lead-based electrodes. Particularly, the titanium oxides $Ti_7O_{13}$, $Ti_8O_{15}$, and combinations thereof, have been shown to produce good results. For example, it has been observed that doping of the positive electrode with titanium oxides can increase its factor of active material use approximately to 85%, and may increase its discharge power by approximately 1.5-2.3 times, depending on the amount of dopant(s) added thereto. The lead-based positive electrode material may alternatively be doped with admixtures of bismuth, such as, for example, $Bi_2O_3$, or $Bi(NO_3)_3 \cdot 5H_2O$. Doping with admixtures of bismuth can result in a reduction of electrical resistance and an increase in discharge power. It has been discovered that discharge properties of an electrode doped with bismuth improve if bismuth atoms (with $Bi^{5+}$ charge state) have a dispersed distribution within the volume of the crystal lattice of lead dioxide and are embedded at specific sites in sub-lattice of lead.

Additionally, it has been observed that the performance of a positive electrode operating in a sulfuric acid electrolyte is based largely on contact resistance between a grid portion and an active mass portion of the electrode. Thus, for example, when a n-type semiconductor, such as lead dioxide, is used as the active mass of a positive electrode, the contact resistance between the active mass and metals or other conductive materials will be substantially dependent on the type and concentration of doping atoms added to the lead dioxide. Preferably, doping of the active mass does not change its sign of conductivity, as such has been found to be detrimental to the performance of the positive electrode. For example, it has been found that if a n-type semiconductor active mass is transformed into a p-type semiconductor due to the addition of a dopant(s), an acute rise in ohmic resistance and a corresponding decrease in the power characteristics of the positive electrode can be observed. Preferably, the dopant(s) is also substantially uniformly distributed throughout substantially the entire volume of the active mass (material).

Characteristics of the negative electrode of a HES of the present invention are also carefully controlled. The double, or dual electric layer discussed earlier, is formed at the interface of the negative electrode and the electrolyte, which, for the purpose of example only, will be assumed to be an aqueous sulfuric acid. More specifically, the following processes occur in the negative electrode of the HES during its charge and discharge within the sulfuric acid aqueous solution electrolyte:

$$H^+/e \leftrightarrow H^+ + e, \quad (1)$$

$$HSO_4^- \leftrightarrow {}^{HSO}\!4^-/p + e, \quad (2)$$

$$H[S] \leftrightarrow H^+ + [S] + e. \quad (3)$$

In equation (1), $H^+/e$ is a double electric layer that is formed during charge of the capacitor from protons ($H^+$) and electrostatic forces (that interact with protons) of electrons (e), which reside in superficial layers of developed surface of negative electrode. In equation (2), $HSO_4^-/p$ is a double electric layer that is formed during discharge of the capacitor from $HSO_4^-$ ions and electrostatic forces of holes (p) that interact with the ions and which reside in near-surface layers of the developed surface of negative electrode. In equation (3), H[S] are complexes that are formed during discharge of the capacitor from protons (H+) and various functional groups [S]. In these complexes, electric charge is localized at functional groups and the protons are in quasibound state. The double electric layer that occurs on the negative electrode of a fully charged capacitor is formed from protons and electrons ($H^+/e$). Disintegration of the double electric layer occurs during discharge of the capacitor. At discharge, released electrons are transferred to a positive electrode through an external electric circuit and protons are transferred to the electrolyte, which retains its electric neutrality. This process lasts until the negative electrode potential value reaches the value equal to a potential value of zero charge of its active mass. The particular value of this potential depends on the properties of the carbon material used and is in 0-0.35V relative to standard hydrogen electrode potential (SHE). It should be noted that the majority of activated carbon materials suitable for use in capacitors have a zero charge potential of approximately 0.15-0.35V. Hence, once negative electrode potential reaches zero charge (which typically corresponds to a capacitor voltage of approximately 1.4-1.5V) a double electric layer comprising $HSO_4^-$ ions and holes is formed in negative electrode. This process lasts until the end of the capacitor's discharge (i.e., upon potential value reaches about 1.0V, which generally corresponds to a capacitor voltage of about 0.7V). Thus, the processes of forming and disintegrating double electric layers ($H^+/e$ and $HSO_4^-/p$) during discharge of the capacitor are sequential processes.

During charging of the capacitor a reverse process occurs. Before negative electrode potential values reaches zero charge potential, the $HSO_4^-/p$ double electric layer completely disintegrates. Further, the process of forming the $H^+/e$ double electric layer occurs until the capacitor is fully charged. This process can be characterized in general by the following equation:

$$H^+/e + HSO_4^- \leftrightarrow H^+ + HSO_4^-/p + 2e, \quad (4)$$

where p is electric charge of the hole.

Forming of complexes H[S] depends on such parameters as: technology of synthesis; crystal structure; size and distribution of pores; electric conductivity type; composition of impurities and defects; electrolyte type; and electrode potential. Along with hydrogen atoms; oxygen atoms, sulfur atoms, and other impurity atoms can also participate in formation of the H[S] complexes. Research shows that when a carbon material is used to form an active mass, its atoms play a key role in forming these complexes. The capacitance contribution of the H[S] complexes to the total capacitance of the negative electrode depends on parameters of the particular carbon material used and on the electrode potential. It is desirable that the additional capacitance created by the specified complexes does not exceed 20% of the double electric layer capacitance. Both forming and disintegrating of H[S] complexes (during discharge and charge of the capacitor) proceeds against a significant energy barrier and, therefore, leads to more significant energy losses than are produced during the charge/discharge process associated with the double electric layer. On the one hand, the specified effect somewhat reduces the charge and discharge rates of the capacitor, but on the other hand, the effect increases its specific energy.

It is known that the capacitance of the negative electrode is closely related to the properties of the material used to form its active mass. For example, when using an activated carbon material, the specific surface area, the size of the pores, the distribution of the pores by volume, the size of the carbon particles, the spatial pattern, the type and value of conductivity, and the chemical purity of the activated carbon, will all affect the capacitance of the negative electrode. As eluded to above, the pores (holes) of the active mass play a part in forming the double electric layers of the HES. However, not all the pores in the near surface layers of the active mass will contribute to double electric layer formation. For example, if the diameter of a pore is too small, the electrolyte will not be able to penetrate the pore. A pore size that is too large, however, will cause a decrease in the specific surface area of the active mass, thereby also decreasing its specific capacitance. Consequently, when using an aqueous sulfuric acid electrolyte, it has been discovered that the pores of the active mass should preferably be formed with a diameter that is between approximately 5 Å and approximately 50 Å. To obtain maximum capacitance in an aqueous electrolyte (such as aqueous sulfuric acid), it has been found that the active mass should have a pore diameter within the aforesaid range, and also have a specific surface area of between about 1,200-1,700 m²/g.

It has been found that the effective resistances of the processes of the negative electrode are also related to the porous structure of the active mass. While pores of smaller diameter make it possible to produce a negative electrode with a higher capacitance, the smaller diameter pores can also cause the repeating process of forming and disintegrating the double electric layers to be met with greater resistance. This leads to a degradation of the power characteristics of the negative electrode, and of the HES in general. When the active mass is provided with pores of larger diameter, the repeating process of forming and disintegrating the double electric layers is met with less resistance, but the specific capacitance of the negative electrode also decreases. Therefore, it can be understood that by manipulating the porosity structure of the active mass of the negative electrode, it is possible to further control (maximize) the specific power and energy characteristics of the HES.

In a case wherein the specific capacitance of the material used to manufacture the active mass of the negative electrode is high, a change in the conductivity type of the superficial layer of the active material a is possible. Such a conductivity change typically results in the formation of thin p-n junction in the superficial layers of the active mass. The formation of p-n junctions can have a detrimental effect on the transfer of electrons to the active material and should generally, therefore, be avoided. Thus, the material forming the active mass of the negative electrode preferably has a concentration of free charge carriers that is greater than about $5 \times 10^{21}$ cm$^{-3}$.

The current collector of the negative electrode can also contribute significantly to the operating characteristics of the HES. For example, the particular construction of the current collector can affect the operating voltage range, the usable voltage range, the operating temperature, the specific energy, the specific power, the stability of output, and the cost of the HES. Thus, it is desirable that the material selected for use as the current collector at least: (1) be stable within a predetermined operating voltage range; (2) ensure good contact with the active mass of the electrode; and (3) have high conductivity. It has been discovered that there is a limited range of materials that meet the above criteria. Within this limited range of materials, it has been observed that lead and its alloys are particularly well suited for use as a negative electrode current collector. Such materials exhibit acceptable stability in many operating electrolytes (or can be made stable), have a high overpotential of hydrogen release, and are relatively low in cost.

Figure 3B:
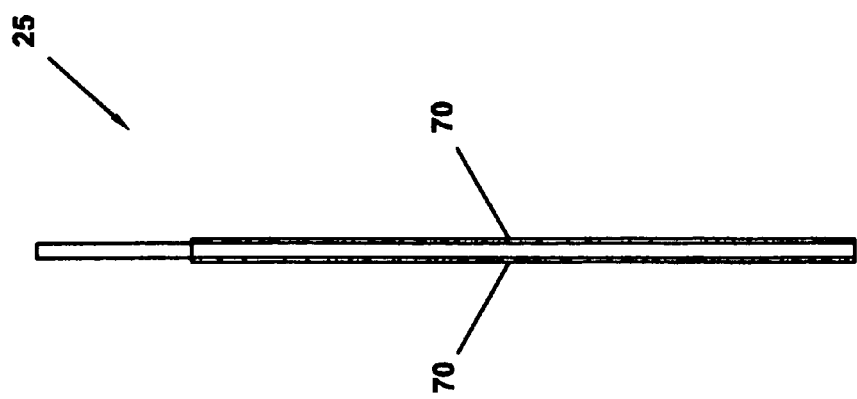
FIG. 3 depicts an exemplary embodiment of a negative electrode current collector with a matching layer that may be used in an HES of the present invention.
Figure 3A:
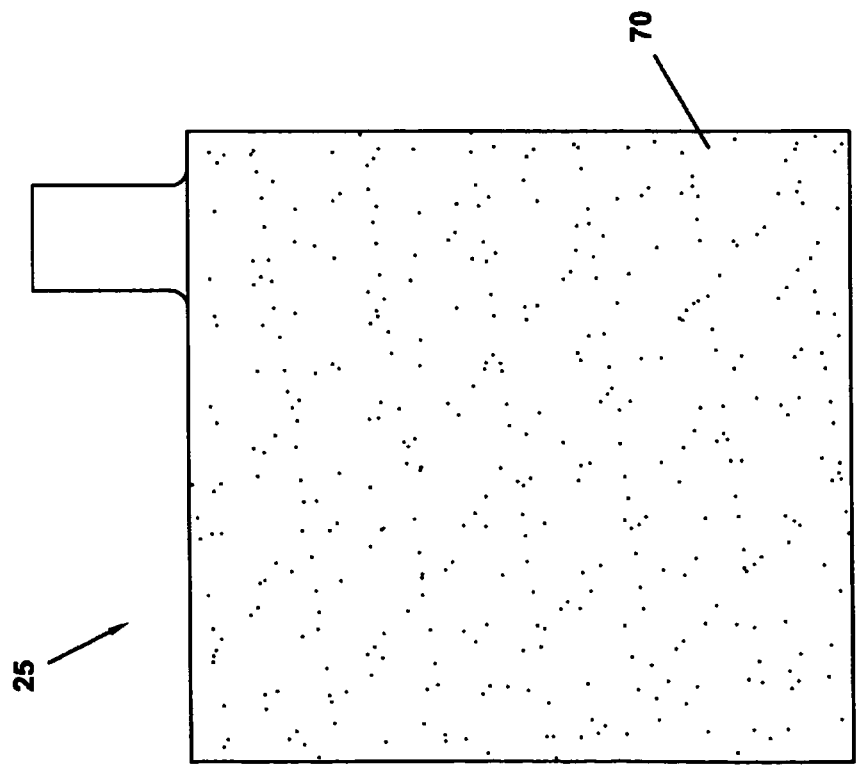

To ensure that charge transfer from the active mass to the current collector of the negative electrode is properly accomplished, it is necessary to take into account the properties of the active mass and the current collector and how those properties will affect their contact resistance. It is understood that the active mass of the negative electrode may exhibit either hole or electron conductivity. Thus, it should also be realized that the contact resistance of the active mass with a lead-based current collector can be different, depending on the type of conductivity, and may also be non-linear in character due to the polarization of the electrode and the change of the charge and discharge currents. Consequently, to ensure satisfactory (and low) contact resistance, the surface of the current collector is preferably coated with a matching layer (see FIG. 3). The matching layer may be of various compositions, depending on the mode of operation of the HES and the properties of the material(s) forming the active mass. For example, it has been found that an acid-resistant polymer and a conducting material such as, for example, c-SiTi$_2$N$_4$, TiCN, TiC, TiN or carbon can be used to create an acceptable matching layer. In one exemplary embodiment, the matching layer may be formed from a conductive composite of remchlorine and Ti$_8$O$_{15}$ powder. In the exemplary embodiment of the present invention described in Example 7(below), the matching layer of the negative electrode current collectors was created based on a mixture of conductive lacquer and lacquer. It has been found that a suitable mixture can be created by combining TICOLAK conductive lacquer (available from Tico in Russia) with URETHANE-CLEAR lacquer (available from Cramolin). Whatever the specific composition, the matching layer preferably also serves to protect the current collector from the electrolyte.

In the particular example of the HES 5 shown in FIGS. 1-2, the positive electrode 10 is constructed from a porous composition of lead dioxide. Lead alone, or other lead compounds may also be used. For example, the active mass may be Pb$_3$O$_4$ or other forms of lead oxide powders. Combinations of lead and/or various lead compounds may also be used to form the positive electrode 10. Although not essential, in this particular embodiment the lead dioxide material is doped with admixtures of titanium, particularly a combination of Ti$_7$O$_{13}$ or Ti$_8$O$_{15}$. Other titanium oxides [Ti$_n$O$_{2n-1}$] may also be used; or admixtures of bismuth, such as, for example, Bi$_2$O$_3$, or Bi(NO$_3$)$_3$.5H$_2$O can be employed as a dopant.

Figure 4:
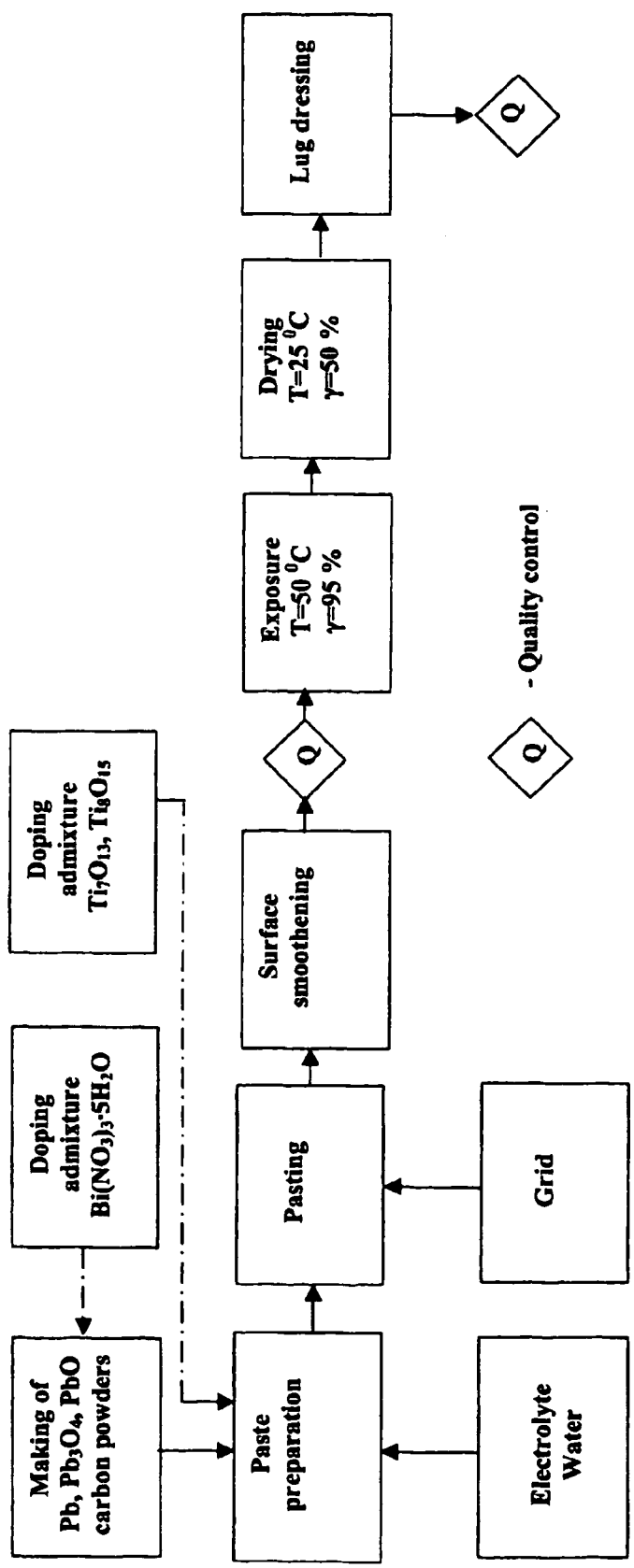
FIG. 4 is a block diagram illustrating one method of preparing a lead-based positive electrode for use in a HES of the present invention.

Manufacture of a positive electrode may be accomplished in various ways, including by known methods. A basic positive electrode manufacturing process can be understood by reference to FIG. 4. In one particular example of the present invention, a combination of lead and lead compounds powders, namely Pb, Pb$_3$O$_4$, and PbO, were mixed in a ratio of 1:9:5, respectively. The particle size of the lead powders was between approximately 0.5-3 μm. The mixture of lead-based powders was then combined with an amount of aqueous sulfuric acid and an amount of distilled water to form a paste. This combination and ratio of materials is provided for the purpose of illustration only, and is not meant to limit the composition of the positive electrode in any way. The exact amount of each material used will depend on the size and number of positive electrodes to be made. If a dopant, such as titanium or bismuth is to be added to the electrode material, it may be introduced to the electrode paste, such as in the form of a fine particle powder, or may be added to the base electrode material prior to paste preparation.

After mixing, the electrode paste was introduced into a conductive electrode grid using a specially constructed device, and was subsequently rolled to compress the paste, to improve contact between the paste and the grid, to extract excess liquid, and to impart a smooth surface to the resulting electrode. The conductive grid in this particular example was made of a lead alloy containing approximately 5% of antimony (Sb), although other conductive materials could also be employed for this purpose. Upon completion of the rolling step, the electrode was immediately placed in a first environmentally-controlled chamber, where it was kept for approximately 24 hours at a temperature of about 50° C. and a relative humidity of about 95%. The electrode was then removed from the first environmentally-controlled chamber and placed into a second environmentally-controlled chamber, where it was dried for approximately an additional 24 hours at a temperature of about 25° C. and a relative humidity of about 50%. It has been found that controlling the drying of the positive electrode in this manner serves to reduce cracking and crumbling thereof. However, the above illustration is not meant to limit the process of manufacturing a positive electrode according to the present invention to the aforementioned steps or parameters. An optimal manufacturing process should be derived for each combination of materials and conditions.

In the particular example of the HES 5 shown in FIGS. 1-2, the negative electrode 15 is preferably constructed by attaching the active mass 20 to the current collector 25. In this embodiment, the active mass 20 of the negative electrode 15 consists of a porous matrix of activated carbon, although a wide range of conductive materials could feasibly be used for this purpose. The activated carbon may exist in various forms, such as, for example, a powder or a fiber cloth. A binding polymer, such as polytetrafluoroethylene, is preferably added to the activated carbon to facilitate formation of the active mass. As discussed earlier, it has been found that the specific power and energy characteristics of the HES 5 can be controlled by manipulating the porosity structure of the negative electrode active mass 20. To this end, the pore diameter of the negative electrode active mass 20 is preferably maintained at between about 5 Å and about 50 Å in diameter, and the surface area of said pores accounts for approximately 60-90% of total developed surface of the active mass.

In the exemplary embodiment of the HES shown in FIGS. 1-2, the current collector 25 is formed from a lead alloy, such as, for example a mixture of lead and tin. While the current collector 25 may be used as formed, in this embodiment, at least a portion thereof is coated with a matching layer 70 (see FIG. 3). The matching layer 70 is selected to provide good contact and minimal resistance between the active mass 20 and the current collector 25. Preferably, the matching layer 70 also protects the current collector 25 from being adversely effected by the electrolyte 45 to which it will be exposed. The matching layer 70 may consist of various compounds. For example, a mixture of remchlorine and $Ti_8O_{15}$ powder and a mixture of conductive lacquer (e.g., TICOLAK) and lacquer (e.g., URETHANE-CLEAR) have both been found to produce good results when used for this purpose. The active mass 20 may be affixed to the current collector 25 by pressing, by an adhesive, or by any other conventional means.

The single-cell HES 5 may be constructed as shown in FIGS. 1-2, wherein the positive electrode 10 is placed in a case 40 to reside between two plates of the negative electrode 15. The positive and negative electrodes 10, 15 are separated by a porous separator 30, and the case is filled with an electrolyte 45 and sealed.

A multi-electrode (multi-cell) HES can also be assembled according to the present invention. The positive electrodes of the multi-cell HES can be formed, as will be described in more detail below, after assembly of the positive electrodes to the cells in the HES case. Positive and negative electrodes as described above may be used in the multi-cell HES. The electrode count in such a multi-cell HES may be, for example $1^+/2^-$ electrodes, $4^+/5^-$ electrodes, or $7^+/8^-$ electrodes. Preferably, the positive and negative electrodes are separated by a porous separator. It has been determined that an acceptable separator may be produced from a type 15064XXP Recomat material, which is available from the Bernard Dumas company in France. Other acceptable separator materials may also be used. Once the electrodes and the separators are installed into the case, the current collector portions of the electrodes are connected to corresponding terminals of each cell.

Once the cells have been assembled, they may be filled with electrolyte, such as the aqueous sulfuric acid solution discussed above. Excess air is preferably pumped from the cells to ensure substantially complete filling of the cell volume with electrolyte. The electrolyte may be cooled prior to its introduction to the cells. For example, the electrolyte temperature may be reduced to approximately 10° C.

Preferably, the electrodes and separator are allowed to soak in the electrolyte for a period of time prior to beginning the positive electrode forming process. As is known, the forming process is an essential part of lead dioxide electrode manufacture. The forming process is known to have a great influence on various characteristics of the positive electrode, such as, for example, its phase and stoichiometric composition of the crystal lattice, the dimension and shape of its crystals, and its specific capacitance and electrical conductivity. The particular forming mode employed depends largely on the technology used to initially prepare (manufacture) the positive electrode, including the exact electrode composition. However, in one particular embodiment of the present invention, the positive electrodes of the multi-cell HES are initially polarized in areas of negative potentials for approximately 10 minutes. The current direction is then reversed, and main-mode forming is conducted for approximately 24 hours. Various parameters of the positive electrodes, such as electrode potential values, cell voltage, and electrolyte temperature, are preferably monitored during forming. The positive electrode forming process described with respect to a multi-cell HES is, of course, equally applicable to a single cell HES.

In order to produce a positive electrode with maximum capacitance and minimum ohmic resistance, the forming process should ensure that the positive electrode's active mass is substantially of a single phase. For example, when the positive electrode consists of lead dioxide ($PbO_2$), the forming process should ensure that the whole of the active mass consists substantially of β-phase lead dioxide. That is, the whole of the active mass should consist substantially of β-phase acicular lead dioxide crystals. The structure and maximum size of the crystals will depend on the forming mode. Preferably, however, the acicular crystals should not exceed about 10-12 μm in length. Acicular crystals of greater length may result in a reduction of electrode capacitance, porosity and electrical conductivity and, therefore, to a degradation of HES performance. Because acicular crystals grow in length in a direction perpendicular to the forming current, it is possible to control their length by controlling the forming mode.

Below, there are several non-limiting examples of HES construction according to the method of the present invention:

Example 1

A multi-cell HES having 7 positive and 8 negative electrodes was assembled in a case. The positive and negative electrodes were separated by a porous separator. The positive electrodes were formed from a mixture of Pb, $Pb_3O_4$, and PbO powders that was made into a paste and introduced to a grid of lead and antimony (5%) alloy. The active mass of the negative electrodes was manufactured from an activated carbon material, as described above, and attached to a current collector comprised of lead and tin (3%) alloy. Both the positive and negative electrodes were formed in the shape of flat plates for insertion into a case. The cells were filled with an aqueous sulfuric acid electrolyte, and the case was sealed.

Example 2

A multi-cell HES having 7 positive and 8 negative electrodes was assembled in a case. The positive and negative electrodes were separated by a porous separator. The positive electrodes were formed from a mixture of Pb, $Pb_3O_4$, and PbO powders that was doped with admixtures of $Ti_7O_{13}$ and $Ti_8O_{15}$ in a weight ratio of 85%:15%, respectively. The mixture was made into a paste, and was introduced to a grid of lead and antimony (5%) alloy. The active mass of the negative electrodes was manufactured from an activated carbon material, as described above, and attached to a current collector comprised of lead and tin (3%) alloy. Both the positive and negative electrodes were formed in the shape of flat plates for insertion into a case. Once cell assembly was complete, the cells were filled with an aqueous sulfuric acid electrolyte. After a soaking period, the positive electrodes were subjected to the forming process.

Example 3

A multi-cell HES having 7 positive and 8 negative electrodes was assembled in a case. The positive and negative electrodes were separated by a porous separator. In one variation, the positive electrodes were formed from a mixture of Pb, $Pb_3O_4$, and PbO powders that was doped with a bismuth ($Bi_2O_3$) powder during paste preparation. In another variation, the positive electrodes were formed by soaking PbO with an acetone solution of bismuth nitrate ($Bi(NO_3)_3 \cdot 5H_2O$). A $Pb_3O_4<Bi>$ powder was then obtained from the mixture and used to form a paste. In both variations, the paste was introduced to a grid of lead and antimony (5%) alloy. The active mass of the negative electrodes was manufactured from an activated carbon material, as described above, and attached to a current collector comprised of lead and tin (3%) alloy. Both the positive and negative electrodes were formed in the shape of flat plates for insertion into a case. Once cell assembly was complete, the cells were filled with an aqueous sulfuric acid electrolyte. After a soaking period, the positive electrodes were subjected to the forming process.

Example 4

A multi-cell HES having 7 positive and 8 negative electrodes was assembled in a case. The positive and negative electrodes were separated by a porous separator. The positive electrodes were formed from a mixture of Pb, $Pb_3O_4$, and PbO powders that was made into a paste and introduced to a grid of lead and antimony (5%) alloy. The active mass of the negative electrodes was manufactured from an activated carbon material, as described above, and attached to a current collector comprised of lead and tin (3%) alloy. The current collectors were subjected to heat treatment. Both the positive and negative electrodes were formed in the shape of flat plates for insertion into a case. The cells were filled with an aqueous sulfuric acid electrolyte, and the case was sealed.

Example 5

A multi-cell HES having 7 positive and 8 negative electrodes was assembled in a case. The positive and negative electrodes were separated by a porous separator. The positive electrodes were formed from a mixture of Pb, $Pb_3O_4$, and PbO powders that was made into a paste and introduced to a grid of lead and antimony (5%) alloy. The active mass of the negative electrodes was manufactured from an activated carbon material, as described above, having hole conductivity. The active mass was attached to a current collector comprised of lead and tin (3%) alloy, having a matching layer of remchlorine and $Ti_8O_{15}$ coated to both sides thereof. The matching layer-coated current collectors were subjected to heat treatment. Both the positive and negative electrodes were formed in the shape of flat plates for insertion into a case. The cells were filled with an aqueous sulfuric acid electrolyte, and the case was sealed.

Example 6

A multi-cell HES having 5 positive and 6 negative electrodes was assembled into a prismatic case of polypropylene copolymer. The positive and negative electrodes were separated by a porous separator constructed from type 15064XXP Recomat. The positive electrodes were formed from a mixture of Pb, $Pb_3O_4$, and PbO powders that was doped with admixtures of $Ti_7O_{13}$ and $Ti_8O_{15}$ in a weight ratio of 85%:15%, respectively. The mixture was made into a paste, and was introduced to a grid of lead and antimony (5%) alloy. The active mass of the negative electrodes was manufactured from an activated carbon material. The active mass had a specific surface of approximately 1,650 $m^2/g$, and a majority of its surface was attributed to pores having an average diameter of between about 5-50 Å. The active mass was attached to a current collector comprised of lead and tin (3%) alloy, having a matching layer of remchlorine and $Ti_8O_{15}$ coated to both sides thereof. The matching layer-coated current collectors were subjected to heat treatment. Both the positive and negative electrodes were formed in the shape of flat plates for insertion into a case. Once cell assembly was complete, the cells were filled with an aqueous sulfuric acid electrolyte. After a soaking period, the positive electrodes were subjected to the forming process. The case was sealed by hermetically welding its lid in place. Terminals of the positive and negative electrodes were sealed to the case by the use of gaskets.

Example 7

A multi-cell HES having 5 positive and 6 negative electrodes was assembled in a case. The positive and negative electrodes were separated by a porous separator. AGM-separator of RECOMAT 15064XXP having 0.4 mm was used as separator. The positive electrodes were formed from a mixture of Pb, $Pb_3O_4$, and PbO powders that was made into a paste and introduced to a grid of lead and antimony (5%) alloy. The active mass of the negative electrodes was made of activated carbon black and a polymer binder. Specific (measured in weight) capacitance, mass density and specific electric resistance of subsequently produced carbon plates measured 876 F/g, 0.38 $g/cm^3$, 0.44 Ohm·cm, respectively. The active mass was attached to a current collector comprised of lead and tin (3%) alloy, and having a matching layer of TICOLAK conductive lacquer and URETHANE-CLEAR lacquer, as described above. The TICOLAK and URETHANE-CLEAR were mixed in a ratio of 100 g:30 g, respectively. Two coats of the lacquer matching layer mixture were applied to both sides of each current collector. After applying the first coat of the lacquer matching layer mixture to both sides of each current collector, the collectors were allowed to dry at room temperature for approximately five hours. The current collectors were subsequently dried in an open air environment for approximately twenty minutes at about 120° C. The second coat of the lacquer matching layer mixture was applied in a similar manner. The total thickness of the matching layer was approximately 30 μm after two coats of the lacquer matching layer mixture were applied an drying was completed. The specific electric resistance of the matching layer measured approximately 1.6 Ohm·cm and the specific resistance of the current collectors measured about 0.45 Ohm·$cm^2$. Both the positive and negative electrodes were formed in the shape of flat plates for insertion into a case. Once cell assembly was complete, the cells were filled with an aqueous sulfuric acid electrolyte. The case was sealed by hermetically welding its lid in place. Terminals of the positive and negative electrodes were sealed to the case by the use of gaskets.

Figure 5:
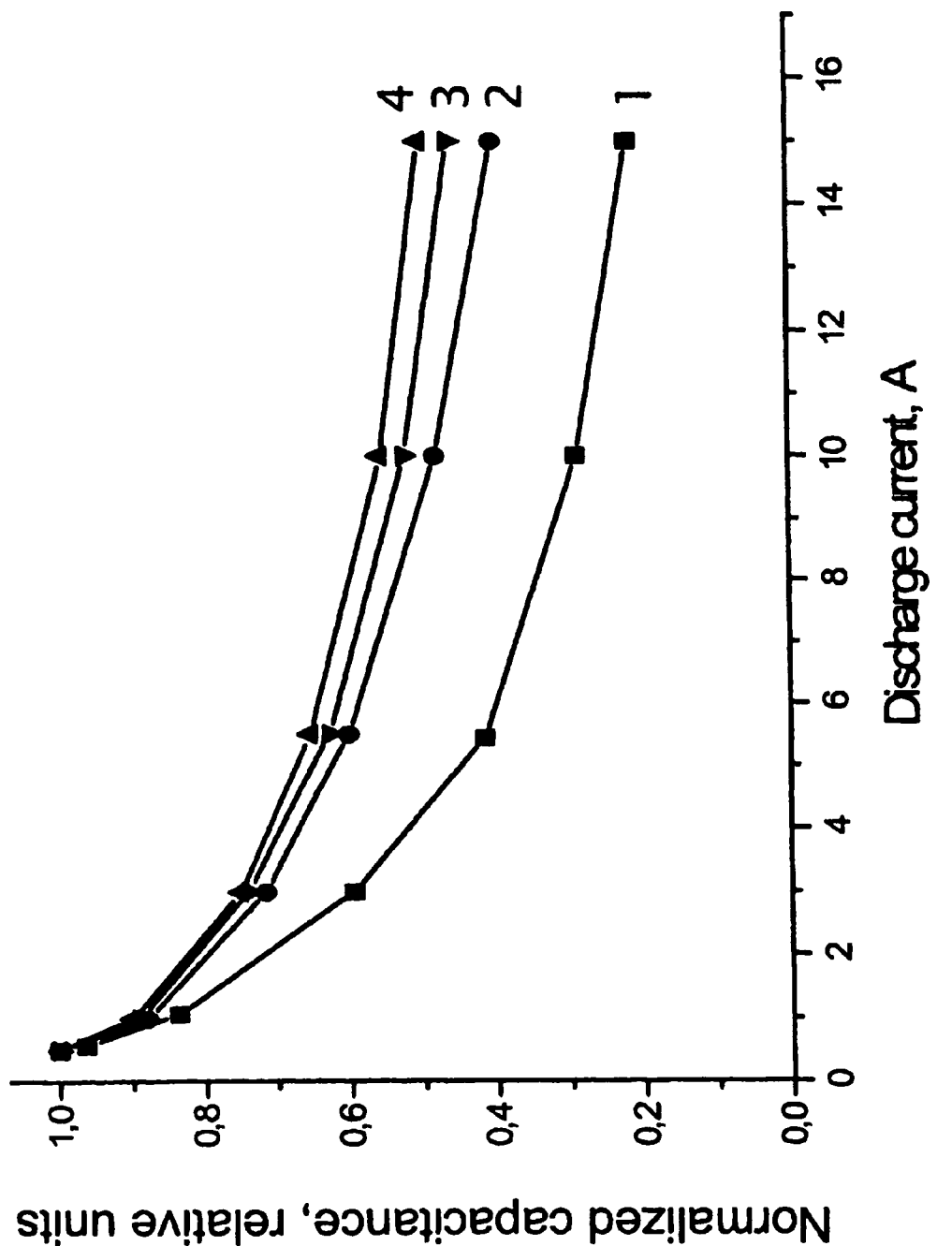
FIG. 5 is a graph illustrating the superior output characteristics of various positive electrode constructions of the present invention in comparison to a traditional positive electrode.

Capacitance characteristics for several of the positive electrodes used in the HES' of examples 1-7 can be observed in FIG. 5. In FIG. 5: curve 1 represents an electrode manufactured by traditional technology; curve 2 represents an electrode manufactured using Pb, PbO, and $Pb_3O_4$ powders; curve 3 represents an electrode manufactured using Pb, PbO, and $Pb_3O_4$ powders doped with bismuth; and curve 4 represents an electrode manufactured using Pb, PbO, and $Pb_3O_4$ powders doped with a conductive powder of titanium oxide. The overall performance characteristics of each HES described in Examples 1-7 can be viewed in FIG. 6.

As can be discerned from the foregoing general description, and from the descriptions of particular exemplary embodiments, a HES of the present invention offers advantages over known electrochemical capacitors. These advantages are obtained by carefully controlling particular characteristics of the HES. For example, the ratio between the charging capacities of the positive electrode and negative electrode of the HES is carefully selected and controlled. An active material of higher efficiency than the active material used by typical electrochemical capacitors is also utilized in the construction of both the positive and negative electrodes of the HES of the present invention. A separator with improved operating parameters is used. Additionally, the negative electrode current collector is preferably manufactured from a material having a matching layer, which ensures high conductivity, high hydrogen gassing overpotential, and high stability within a range of negative electrode operating potentials within the electrolyte environment of the HES.

While certain embodiments of the present invention are described in detail above, the scope of the invention is not to be considered limited by such disclosure. For example, it should be understood that the specific HES constructions disclosed are not to be considering limiting. It is contemplated that modifications to the construction and method of construction according to the present invention are possible without departing from the spirit of the invention as evidenced by the following claims:

What is claimed is:

1. A double electric layer heterogeneous electrochemical capacitor, comprising:
   a sealable case for housing the components of said capacitor;
   at least one positive electrode comprised of a porous, conductive lead-based material containing a dopant;
   at least one negative electrode having a porous active mass portion affixed to a current collector portion;
   a porous separator separating said at least one positive and negative electrode; and
   an aqueous sulfuric acid electrolyte which penetrates into pores in each of said electrodes and said separator;
   wherein approximately 60% to approximately 90% of a developed surface area of said active mass of said at least one negative electrode contains pores of between about 5 Å and about 50 Å in diameter; and
   wherein said current collector portion of said negative electrode is made of a lead-tin alloy.

2. The heterogeneous electrochemical capacitor of claim 1, wherein said at least one positive electrode is non-polarizable.

3. The heterogeneous electrochemical capacitor of claim 1, wherein said at least one negative electrode is polarizable.

4. The heterogeneous electrochemical capacitor of claim 1, wherein said lead-based material consists essentially of a mixture of Pb, $Pb_3O_4$ and PbO powders.

5. The heterogeneous electrochemical capacitor of claim 4, wherein approximately 5-20 weight percent of Pb, approximately 40-70 weight percent of $Pb_3O_4$, and approximately 10-40 weight percent of PbO is used.

6. The heterogeneous electrochemical capacitor of claim 4, wherein the particle size of said Pb, $Pb_3O_4$ and PbO powders is between about 0.5 μm and about 3.0 μm.

7. The heterogeneous electrochemical capacitor of claim 1, wherein, after being subjected to a forming process, said lead-based material is comprised at least substantially of β-phase acicular crystals.

8. The heterogeneous electrochemical capacitor of claim 7, wherein said β-phase acicular crystals are between about 10.0 μm and about 12.0 μm in length.

9. The heterogeneous electrochemical capacitor of claim 1, wherein said dopant is an admixture of titanium oxide.

10. The heterogeneous electrochemical capacitor of claim 1, wherein approximately 0.8-15 atomic percent of titanium oxide is present.

11. The heterogeneous electrochemical capacitor of claim 9, wherein said titanium oxide is of a composition that comports with the chemical formula $Ti_nO_{2n-1}$.

12. The heterogeneous electrochemical capacitor of claim 11, wherein said titanium oxide is $Ti_7O_{13}$, $Ti_8O_{15}$, or a combination of both.

13. The heterogeneous electrochemical capacitor of claim 1, wherein said dopant is an admixture of bismuth.

14. The heterogeneous electrochemical capacitor of claim 13, wherein said admixture of bismuth is $Bi_2O_3$ or $Bi(NO_3)_3 \cdot 5H_2O$.

15. The heterogeneous electrochemical capacitor of claim 13, wherein approximately 2.0-8.0 atomic percent of bismuth is present.

16. The heterogeneous electrochemical capacitor of claim 1, wherein said active mass of said negative electrode consists essentially of an activated carbon material.

17. The heterogeneous electrochemical capacitor of claim 1, wherein said active mass of said negative electrode consists essentially of an activated carbon black.

18. The heterogeneous electrochemical capacitor of claim 1, wherein said active mass of said negative electrode consists essentially of mixture of an activated carbon material and of an activated carbon black.

19. The heterogeneous electrochemical capacitor of claims 16, 17 or 18, wherein said active mass has a specific surface area of between about 1,200 $m^2/g$ and about 1,700 $m^2/g$.

20. The heterogeneous electrochemical capacitor of claim 19, further comprising a polymer binder.

21. The heterogeneous electrochemical capacitor of claim 1, wherein said current collector of said negative electrode is thermally treated.

22. The heterogeneous electrochemical capacitor of claim 1, wherein said current collector of said negative electrode contains approximately 1.5-4.0 weight percent of tin.

23. The heterogeneous electrochemical capacitor of claim 1, further comprising a matching layer coated to at least a portion of said current collector of said negative electrode.

24. The heterogeneous electrochemical capacitor of claim 23, wherein said matching layer consists essentially of a polymer that is chemically stable in a sulfuric acid electrolyte and an amount of a conductive titanium oxide compound.

25. The heterogeneous electrochemical capacitor of claim 23, wherein said matching layer consists essentially of a polymer that is chemically stable in a sulfuric acid electrolyte and an amount of a conductive material selected from the group consisting of $SiTi_2N_4$, TiCN, TiC, TiN and carbon.

26. The heterogeneous electrochemical capacitor of claim 1, wherein said electrodes have an asymmetric absolute capacitance.

27. The heterogeneous electrochemical capacitor of claim 26, wherein the absolute capacitance of one of said electrodes is at least three times greater than the absolute capacitance of the other electrode.

28. A method of constructing a double electric layer heterogeneous electrochemical capacitor, comprising:
providing a sealable case for housing the components of said capacitor;
locating at least one positive electrode comprised of a porous, conductive lead-based material containing a dopant within said case;
locating at least one negative electrode having a porous active mass portion affixed to a current collector portion within said case;
placing a porous separator between said at least one positive and negative electrode;
substantially filling said case with an aqueous sulfuric acid electrolyte which penetrates into pores in each of said electrodes and said separator;
subjecting said at least one positive electrode to a forming process; and
sealing said case;
wherein approximately 60% to approximately 90% of a developed surface area of said active mass of said at least one negative electrode contains pores of between about 5 Å and about 50 Å in diameter; and
wherein said current collector portion of said negative electrode is made of a lead-tin alloy.

29. The method of claim 28, wherein said at least one positive electrode is non-polarizable.

30. The method of claim 28, wherein said at least one negative electrode is polarizable.

31. The method of claim 28, wherein said lead-based material consists essentially of a mixture of Pb, $Pb_3O_4$ and PbO powders.

32. The method of claim 28, wherein said dopant is an admixture of titanium oxide.

33. The method of claim 28, wherein said dopant is an admixture of bismuth.

34. The method of claim 28, wherein said forming process causes the formation of β-phase acicular crystals substantially throughout said lead-based material.

35. The method of claim 34, wherein said forming process is selected to produce β-phase acicular crystals of between about 10.0 μm and about 12.0 μm in length.

36. The method of claim 28, further comprising providing a matching layer between said active mass and said current collector of said negative electrode.

37. The method of claim 36, wherein said matching layer consists essentially of a polymer that is chemically stable in a sulfuric acid electrolyte and an amount of a conductive titanium oxide compound.

38. The method of claim 36, wherein said matching layer consists essentially of a polymer that is chemically stable in a sulfuric acid electrolyte and an amount of a conductive material selected from the group consisting of $c-SiTi_2N_4$, TiCN, TiC, TiN and carbon.

39. A double electric layer heterogeneous electrochemical capacitor, comprising:
a sealable case for housing the components of said capacitor;
at least one positive electrode comprised of a mixture of Pb, $Pb_3O_4$ and PbO powders, said mixture doped with a combination of $Ti_7O_{13}$ and $Ti_8O_{15}$;
at least one negative electrode having a porous active mass of an activated carbon material, said active mass affixed to a current collector comprised of a lead-tin alloy and coated with a conductive polymer matching layer;
a porous separator separating said at least one positive and negative electrode; and
an aqueous sulfuric acid electrolyte which penetrates into pores in each of said electrodes and said separator;
wherein said active mass of said at least one negative electrode has a specific surface area of between about 1,200 $m^2/g$ and about 1,700 $m^2/g$; and
wherein approximately 60% to approximately 90% of a developed surface area of said active mass of said at least one negative electrode contains pores of between about 5 Å and about 50 Å in diameter.

40. A method of constructing a multi-cell double electric layer heterogeneous electrochemical capacitor, comprising:
providing a sealable case for housing the components of said capacitor;
forming a plurality of positive electrodes from an active material mixture of Pb, $Pb_3O_4$ and PbO powders doped with a combination of $Ti_7O_{13}$ and $Ti_8O_{15}$;
locating said plurality of positive electrodes within said case;
forming a plurality of negative electrodes by affixing a porous active mass of an activated carbon material to a current collector that is comprised of a lead-tin alloy and is coated with a conductive polymer matching layer, approximately 60% to approximately 90% of a developed surface area of said active mass containing pores of between about 5 Å and about 50 Å in diameter;
locating said plurality of negative electrodes within said case;
placing a porous separator between each positive and negative electrode within said case;
connecting current collector portions of each electrode to a corresponding terminal on said case;
substantially filling said case with an aqueous sulfuric acid electrolyte which penetrates into pores in each of said electrodes and said separator;
subjecting said plurality of positive electrodes to a forming process, whereby substantially all of said active material thereof is formed into β-phase acicular crystals of between about 10.0 μm and about 12.0 μm in length; and
sealing said case;
wherein said positive and negative electrodes are located within said case in an alternating arrangement, such that there is one more negative electrode than positive electrode present.

* * * * *

UNITED STATES PATENT AND TRADEMARK OFFICE
CERTIFICATE OF CORRECTION

PATENT NO. : 7,312,976 B2
APPLICATION NO. : 11/359097
DATED : December 25, 2007
INVENTOR(S) : Samvel Avakovich Kazaryan et al.

It is certified that error appears in the above-identified patent and that said Letters Patent is hereby corrected as shown below:

In column 4, line 40, please delete "$Bi(NO_3)_3.5H_2O$" and insert -- $Bi(NO_3)_3 \bullet 5H_2O$ --.

In column 5, line 12, please delete "$HSO_4^- \leftrightarrow {}^{HSO_4^-}/p + e$" and insert
-- $HSO_4^- \leftrightarrow HSO_4^-/p + e$ --.

In column 7, line 52, please delete "7(below)," and insert -- 7 (below), --.

In column 8, line 5, please delete "$Bi(NO_3)_3.5H_2O$" and insert -- $Bi(NO_3)_3 \bullet 5H_2O$ --.

In column 11, line 11, please delete "$Bi(NO_3)_3.5H_2O$" and insert -- $Bi(NO_3)_3 \bullet 5H_2O$ --.

In column 14, lines 22-23, please delete "$Bi(NO_3)_3.5H_2O$" and insert
-- $Bi(NO_3)_3 \bullet 5H_2O$ --.

Signed and Sealed this

Sixth Day of May, 2008

JON W. DUDAS
*Director of the United States Patent and Trademark Office*